(12) United States Patent
Slakey

(10) Patent No.: US 10,580,183 B2
(45) Date of Patent: Mar. 3, 2020

(54) IMAGING USING A BIOLOGICAL-LIFEFORM VISUAL PERSPECTIVE

(71) Applicant: Kinley Maria Slakey, Washington, DC (US)

(72) Inventor: Kinley Maria Slakey, Washington, DC (US)

( * ) Notice: Subject to any disclaimer, the term of this patent is extended or adjusted under 35 U.S.C. 154(b) by 208 days.

(21) Appl. No.: 15/844,433

(22) Filed: Dec. 15, 2017

(65) Prior Publication Data
US 2019/0188888 A1     Jun. 20, 2019

(51) Int. Cl.
| | | |
|---|---|---|
| *G06T 11/60* | (2006.01) | |
| *G06T 7/60* | (2017.01) | |
| *H04N 5/247* | (2006.01) | |
| *A01K 29/00* | (2006.01) | |

(52) U.S. Cl.
CPC .......... *G06T 11/60* (2013.01); *A01K 29/005* (2013.01); *G06T 7/60* (2013.01); *H04N 5/247* (2013.01); *G06T 2200/21* (2013.01); *G06T 2207/10024* (2013.01); *G06T 2207/30232* (2013.01)

(58) Field of Classification Search
CPC ... A01K 29/005; G06T 11/60; G06T 2200/21; G06T 2207/10024; G06T 2207/30232; G06T 7/60
See application file for complete search history.

(56) References Cited

U.S. PATENT DOCUMENTS

2016/0127641 A1*   5/2016   Gove ................... G06T 1/0007
                                                                               348/143
2017/0061034 A1*   3/2017   Ritchey ................. G16H 40/63

OTHER PUBLICATIONS

"How Google Photos tells the difference between dogs, cats, bears, and any other animal in your photos," at http://bgr.com/2015/06/04/google-photos-image-recognition-dogs-cats-animals/, Jun. 5, 2015.
"Automated identification of animal species in camera trap images," at https://link.springer.com/article/10.1186/1687-5281-2013-52, Mar. 29, 2016.
"New Software Lets You See the World Through Animal Eyes," at https://gizmodo.com/new-software-lets-you-see-the-world-through-animal-eyes-1722649382, Aug. 9, 2015.

* cited by examiner

*Primary Examiner* — Manuchehr Rahmjoo
(74) *Attorney, Agent, or Firm* — Steven Stupp

(57) ABSTRACT

During an imaging technique, an electronic device (such as a cellular telephone) may acquire a first image of a biological lifeform using a first imaging sensor in the electronic device. Then, the electronic device may identify the biological lifeform in the first image. For example, the biological lifeform may be an animal or an insect. Moreover, the electronic device may acquire a second image of an object using one of the first imaging sensor or a second imaging sensor in the electronic device. Next, the electronic device may generate a modified second image of the object based on one or more visual effects associated with the identified biological lifeform. In particular, the one or more visual effects may be based on an approximate or an estimated visual perspective of the biological lifeform.

20 Claims, 6 Drawing Sheets

IMAGING USING A BIOLOGICAL-LIFEFORM VISUAL PERSPECTIVE

BACKGROUND

Field

The described embodiments relate to techniques for generating an image from the visual perspective of an identified or specified biological lifeform, such as an animal or an insect.

Related Art

Self-portraits (which are often referred to as 'selfies') are popular photographs made using portable electronic devices, such as cellular telephones that include digital cameras (which are sometimes referred to as 'smartphones'). Users of social networks often share such pictures with their friends and family.

However, it is often difficult to acquire a high-quality selfie. For example, the viewing perspective of the digital camera in a selfie is different from that of a subject. Consequently, the subject can only imagine or guess what the digital camera 'sees.' This can make it difficult for the subject to align a picture or to choose an appropriate composition.

SUMMARY

The described embodiments relate to an electronic device (such as a cellular telephone) that generates a modified image. This electronic device includes one or more imaging sensor (such as a CCD or a CMOS imaging sensor). During operation, the electronic device acquires a first image of a biological lifeform using a first imaging sensor in the one or more imaging sensors. Then, the electronic device identifies the biological lifeform in the first image. Moreover, the electronic device acquires a second image of an object using one of the first imaging sensor or a second imaging sensor in the one or more imaging sensors. Next, the electronic device generates a modified second image of the object based on a visual effect associated with the identified biological lifeform.

For example, the biological lifeform may be an animal or an insect.

Moreover, the visual effect may approximate a visual perspective of the biological lifeform. In particular, the visual effect may include at least one of: color filtering corresponding to a chromate type of the biological lifeform, a field of view of the biological lifeform, or a resolution of the biological lifeform. Alternatively or additionally, the visual effect may correspond to a number of eyes of the biological lifeform. In some embodiments, the electronic device determines a distance from the electronic device to the object or from the biological lifeform to the object, and the visual effect corresponds to a visual acuity of the biological lifeform.

Furthermore, the second image may include a video and the visual effect may correspond to a refresh rate of vision associated with the biological lifeform.

Additionally, the second image may be acquired using an imaging configuration corresponding to vision associated with the biological lifeform.

Another embodiment provides an integrated circuit for use with the electronic device. This integrated circuit may perform at least some of the aforementioned operations of the electronic device. In some embodiments, the integrated circuit includes the one or more imaging sensors.

Another embodiment provides a computer-readable storage medium for use with the electronic device. This computer-readable storage medium may include a program module that, when executed by the electronic device, causes the electronic device to perform at least some of the aforementioned operations.

Another embodiment provides a method. This method includes at least some of the operations performed by the electronic device.

This Summary is provided for purposes of illustrating some exemplary embodiments, so as to provide a basic understanding of some aspects of the subject matter described herein. Accordingly, it will be appreciated that the above-described features are examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

An imaging technique is described. During the imaging technique, an electronic device (such as a cellular telephone) may acquire a first image of a biological lifeform using a first imaging sensor in the electronic device. Then, the electronic device may identify the biological lifeform in the first image. For example, the biological lifeform may be an animal or an insect. Moreover, the electronic device may acquire a second image of an object using one of the first imaging sensor or a second imaging sensor in the electronic device. Next, the electronic device may generate a modified second image of the object based on one or more visual effects associated with the identified biological lifeform.

By generating the modified second image, the imaging technique provides an approximation to the visual perspective of the biological lifeform. Moreover, by identifying the biological lifeform, the imaging technique may facilitate automated generation of the modified second image of the object without requiring further user action or intervention, which may surprise and please a user of the electronic device. Consequently, the imaging technique allows a user of the electronic device (who may be the object) to select the appropriate alignment and composition, and allows the user to see the word through the eyes of another, such as an animal or an insect. Therefore, the imaging technique may facilitate creativity and the exchange interesting images. In these ways, the imaging technique may improve the user experience when using the electronic device and may increase customer loyalty.

In the discussion that follows, a cellular telephone is used as an illustrative example of the electronic device. However, a wide variety of electronic devices may be used in conjunction with or to implement the imaging technique.

Moreover, in the discussion that follows, the electronic device may communicate using one or more of a wide variety of communication protocols. For example, the communication may involve wired and/or wireless communication. Consequently, the communication protocols may include: an Institute of Electrical and Electronics Engineers (IEEE) 802.11 standard (which is sometimes referred to as 'Wi-Fi®,' from the Wi-Fi Alliance of Austin, Tex.), Bluetooth® (from the Bluetooth Special Interest Group of Kirkland, Wash.), another type of wireless interface (such as another wireless-local-area-network interface), a cellular-telephone communication protocol (e.g., a 3G/4G/5G communication protocol, such as UMTS, LTE), an IEEE 802.3 standard (which is sometimes referred to as 'Ethernet'), etc. In the discussion that follows, a cellular-telephone protocol is used as an illustrative example.

Figure 1:
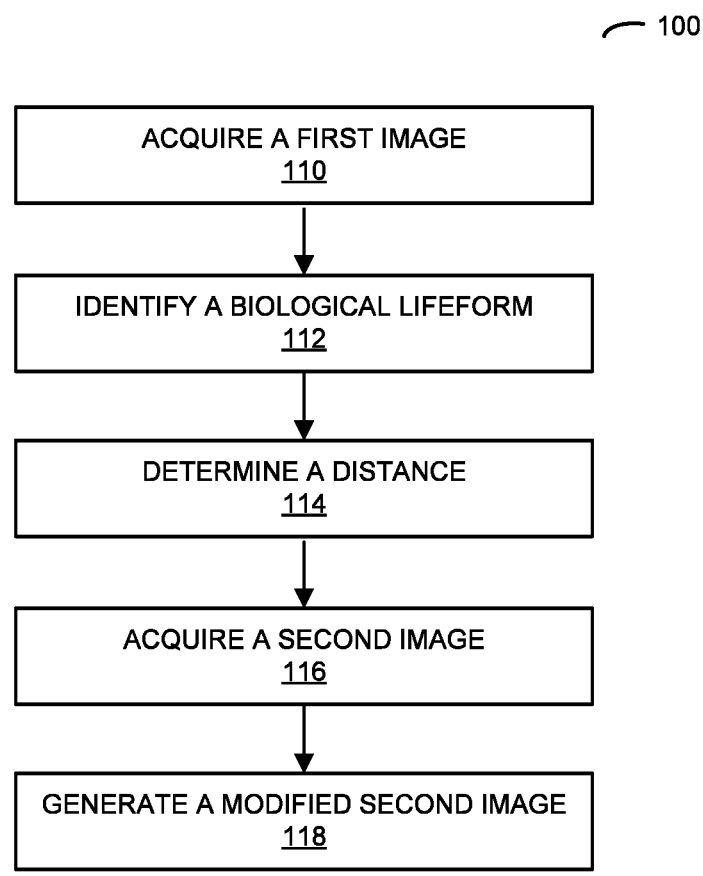
FIG. 1 is a flow diagram illustrating a method for generating a modified second image in accordance with an embodiment of the present disclosure.

We now describe some embodiments of the imaging technique. FIG. 1 presents a flow diagram illustrating an example of a method 100 for generating a modified second image. This method may be performed by an electronic device (such as electronic device 500 in FIG. 5) or a component in the electronic device (such as an integrated circuit or a processor).

During operation, the electronic device may acquire a first image (operation 110) of a biological lifeform using a first imaging sensor in the electronic device. For example, in response to a receiving a first signal corresponding to user activation of a physical or a virtual button or an elapsed timer, the electronic device may provide a second signal to the first imaging sensor (such as a front-facing camera, e.g., a CDD or a CMOS imaging sensor) to activate a shutter associated with the first imaging sensor.

Then, the electronic device may identify the biological lifeform (operation 112) in the first image, such as an animal (e.g., a *Canus* or a 'dog', a *Felis silvestris catus* or a 'cat', etc.) or an insect (e.g., a fly). For example, the biological lifeform may be identified using one or more of a set of neural networks that receive the first image as an input and that output an identity of the biological lifeform. Alternatively or additionally, features associated with (which may mean 'related to') the biological lifeform may be compared to sets of features and associated annotations, such as names of or types of animals or insects. The identification or classification of the biological lifeform may be performed iteratively based on a hierarchy, such as by first identifying a species, then a genus, etc. Note that the identification or classification may also be based on historical information (such as identification of the biological lifeform on one or more previous occasions) and/or predefined personal information (such as photographs of a family pet, as well as the pet's name, species and/or breed).

In general, a variety of image-processing and/or classification techniques may be used in operation 112, such as one or more of: normalizing a magnification or a size of the biological lifeform, rotating the biological lifeform to a predefined orientation, extracting the features that may be used to identify the biological lifeform, etc. Note that the extracted features may include: edges associated with objects in the first image, corners associated with the objects, lines associated with objects, conic shapes associated with objects, color regions within the image, and/or texture associated with objects. In some embodiments, the features are extracted using a description technique, such as: scale invariant feature transform (SIFT), speed-up robust features (SURF), a binary descriptor (such as ORB), binary robust invariant scalable keypoints (BRISK), fast retinal keypoint (FREAK), etc.

Moreover, the electronic device may acquire a second image (operation 116) of an object using one of the first imaging sensor or a second imaging sensor in the one or more imaging sensors. For example, in response to a receiving a first signal corresponding to another user activation of a physical or a virtual button or another elapsed time, the electronic device may provide a third signal to the first imaging sensor or the second imaging sensor (such as a rear-facing camera, e.g., a CDD or a CMOS imaging sensor) to activate the shutter associated with the first imaging sensor or a shutter associated with the second imaging sensor.

Next, the electronic device may generate the modified second image (operation 118) of the object based on one or more visual effects associated with the identified biological lifeform. In particular, the one or more visual effects may approximate a visual perspective of the biological lifeform, so that the modified second image approximates how the biological lifeform 'sees' the object (such as a user of the electronic device).

For example, the one or more visual effects may include at least one of: color filtering corresponding to (which may mean 'a function of') a chromate type of the biological lifeform (such as a number of photoreceptor types, e.g., a number of rods and/or cones, the spatial arrangement of the rods and/or cones, and the associated wavelengths of light to which the rods and/or cones are sensitive), a field of view of the biological lifeform, or a resolution of the biological lifeform. Alternatively or additionally, the one or more visual effects may correspond to a number of eyes of the biological lifeform (or, in the case of, e.g., a fly or a Mantis Shrimp, a number of ommatidia or optical units with one or more photoreceptors in each compound eye), a pupil shape of the eyes of the biological lifeform, positions or placement of the eyes on the biological lifeform (such as whether the biological lifeform has binocular vision), and/or a current orientation of the eyes of the biological lifeform or one or more gaze direction(s) of the biological lifeform (which may be tracked or measured by the electronic device and/or which that electronic device may determine based on the first image). In general, one or more image-processing techniques may be used to implement the one or more visual effects, such as by applying: one or more optical filters to the second image (e.g., a low-pass filter, a filter corresponding to a focal length, an angular filter for a particular field of view, a distortion filter associated with astigmatism, etc.), interpolation (e.g., minimum bandwidth interpolation, spline interpolation, etc.), temporal sampling at a different sampling or refresh rate, etc. Note that in some embodiments the one or more visual effects are implemented by the electronic device by constructing a visual model of the biological lifeform. Then, based on a current orientation of the eyes of the biological lifeform and the positions of content in the second image, a current visual perspective of the biological lifeform for use in the modified second image may be rendered or generated.

In some embodiments, the electronic device performs one or more optional additional operations. For example, the electronic device may determine a distance (operation 114) from the electronic device to the object or from the biological lifeform to the object, and the one or more visual effects may correspond to a visual acuity (or a clarity of sharpness of vision, as determined by or corresponding to, e.g., a spatial luminance contrast sensitivity function) of the biological lifeform (such as, for cats, a visual acuity of 15-20 cycles per degree or CPD, which may make it difficult to focus on objects more than 20 ft away). In some embodiments, the distance is determined using a measurement (such as time of flight) and/or a calculation based on measured or estimated positions of the biological lifeform, the object and/or the electronic device. Note that a position of the electronic device may be measured using a global positioning system, a local positioning system, wireless communication (e.g., with a cellular-telephone network or a wireless local area network), etc. More generally, the position of the electronic device may be measured using triangulation and/or trilateration. Moreover, the positions of the biological lifeform or the object may be determined based on a size of the biological lifeform in the first image or the object in the second image, and a focal length of the first imaging sensor used to acquire the first image or the first or second imaging sensor used to acquire the second image.

Furthermore, prior to generating the modified second image (operation 118), the electronic device may analyze the second image to estimate lighting conditions (such as the luminous intensity or luminance) or the time of day, and/or may measure the lighting conditions (such as the luminous intensity) in a surrounding environment of the electronic device. Alternatively, other information, such as whether a flash fired or discharged, may be used. This lighting-condition information may be used when generating the modified second image (operation 118). For example, depending on the time of day (such as daytime vs. nighttime) or the measured or estimated luminance, different types of photoreceptors having different spatial arrangements in the eyes of the biological lifeform may be sensitive to light, which may help determine the modified second image.

Additionally, the second image may include a video and the one or more visual effects may correspond to a refresh rate of vision associated with the biological lifeform.

Note that the second image may be acquired using an imaging configuration (such as one or more of an illumination wavelength, an illumination intensity, a shutter speed, a focal length, a field of view, etc.) corresponding to vision associated with the biological lifeform. This may improve the image quality (such as the signal-to-noise ratio, the contrast, etc.) of the modified second image.

In some embodiments of method 100, there may be additional or fewer operations. For example, instead of acquiring the first image (operation 110) and/or identifying the biological lifeform (operation 112), the electronic device may receive information (such as from a user of electronic device) that specifies the biological lifeform. In particular, the user may: select the biological lifeform from a list of available biological lifeforms, enter the information specifying the biological lifeform using a user interface, and/or verbally or nonverbally (such as with a gesture) communicate the information specifying the biological lifeform. Then, using this information, the electronic device may perform the remaining operations in method 100. Moreover, the order of the operations may be changed, and/or two or more operations may be combined into a single operation.

Figure 2:
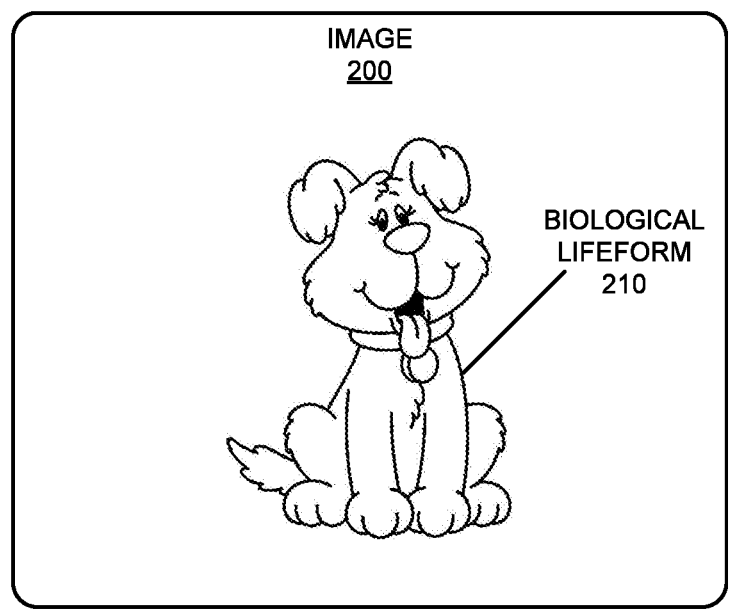
FIG. 2 is a drawing illustrating an image of a biological lifeform in accordance with an embodiment of the present disclosure.

Embodiments of the imaging technique are further illustrated in FIG. 2, which presents a drawing illustrating an example image 200 of a biological lifeform 210. In particular, biological lifeform 210 may be a dog. After acquiring image 200, the electronic device may analyze image 200 to identify that biological lifeform 210 is a dog or a particular breed of dog (such as Golden Retriever or a Border Collie).

As described further below with reference to FIG. 6, based on the identification, the electronic device may access information that specifies a visual perspective of canines as a species or even a particular breed of dog. For example, dogs have two types of cones (which are sensitive to blue and yellow light), but not the type of cone that is sensitive to red/green light as is the case in human vision. Consequently, the vision of a dog may be comparable to a human that is red-green color blind. Moreover, the central field of view of a dog may be ±60°, and their peripheral field of view, with lower resolution, may extend from ±30° to ±150°. (In contrast, the central field of view of a human may be ±140°, and their peripheral field of view may extend from ±140° to ±170°.) Moreover, during daylight hours and lighting conditions, a visual acuity of a dog may be about 7.5-12.6 CPD (versus 50-60 CPD for a human). As described further below with reference to FIG. 4, this information may be used to modify an image so that it approximates the visual perspective of the dog.

Alternatively, if biological lifeform 210 is a cat, the information may specify that there are two types of cones (which are sensitive to blue and yellow light), a central field of view of ±170°, a peripheral field of view, with lower resolution, from ±170° to ±200°, about 6× lower resolution than a human in daylight (but up to 7× resolution than a human in low lighting conditions, such as at night), and a visual acuity of 15-20 CPD. In embodiments where the field of view is larger than that of a human, the electronic device may capture the second image using multiple imaging sensors, so that the necessary image content is available to be included in the modified second image. Moreover, if biological lifeform 210 is a bee or a butterfly, the information may specify three types of photoreceptors that are sensitive to yellow, blue and ultraviolet light or, respectively, four types of photoreceptors that are sensitive to red, green, blue and ultraviolet light, and a reduced visual acuity relative to a human (such as, for a butterfly, a visual acuity of 4% that of a human). In either of these cases, at least one of the imaging sensors in the electronic device may be sensitive in the ultraviolet, so that the necessary ultraviolet content that is seen by the bee or the butterfly is available to be included in the modified second image. Similarly, if biological lifeform 210 is sensitive to polarized light (such as a Cuttlefish, a bat or a scarab beetle), at least one of the imaging sensors in the electronic device may include an appropriate polarization filter, so that the necessary polarized content is available to be included in the modified second image. Furthermore, if biological lifeform 210 is a bird (such as an eagle), the information may specify four types of photoreceptors that are sensitive to red, green, blue and ultraviolet light, a resolution up to 2.5× that of a human and a visual acuity up to 137 CPD at high luminance levels. Additionally, if biological lifeform 210 is a rattlesnake, the information may specify photoreceptors with low color resolution in daylight and higher greyscale resolution at night. For a rattlesnake, the information may also specify that a type of photoreceptor that is sensitive to infrared light. In this case, at least one of the imaging sensors in the electronic device may be sensitive in the infrared, so that the necessary infrared content that is seen by the rattlesnake is available to be included in the modified second image.

As an illustrative example, in the discussion that follows biological lifeform 210 is a dog.

Figure 3:
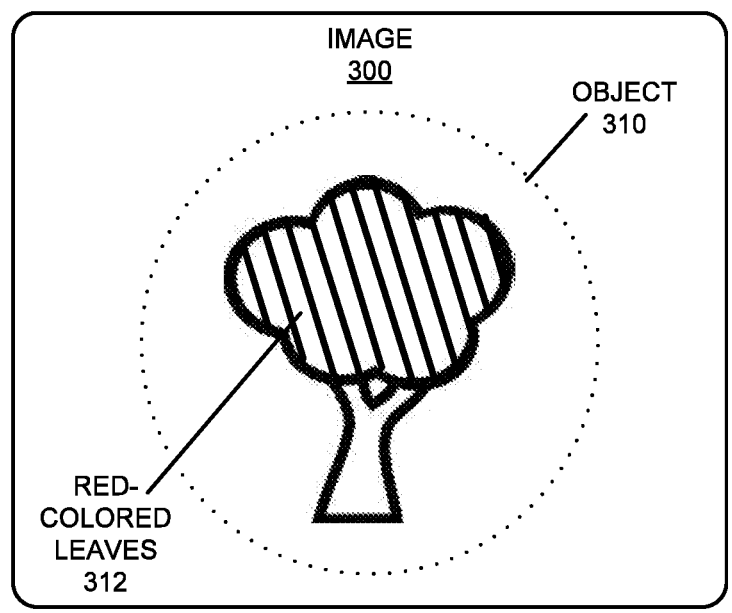
FIG. 3 is a drawing illustrating an image of an object in accordance with an embodiment of the present disclosure.

FIG. 3 presents a drawing illustrating an example of an image 300 of an object 310. In particular, after acquiring image 200 (FIG. 2) and identifying biological lifeform 210 (FIG. 2), the electronic device may acquire image 300. In some embodiments, object 310 is a person, such as a user of the electronic device. However, more generally, object 310 may be one or more individuals, another animal and/or an inanimate object. As an illustrative example, object 310 may include a tree with red-colored leaves 312.

Figure 4:
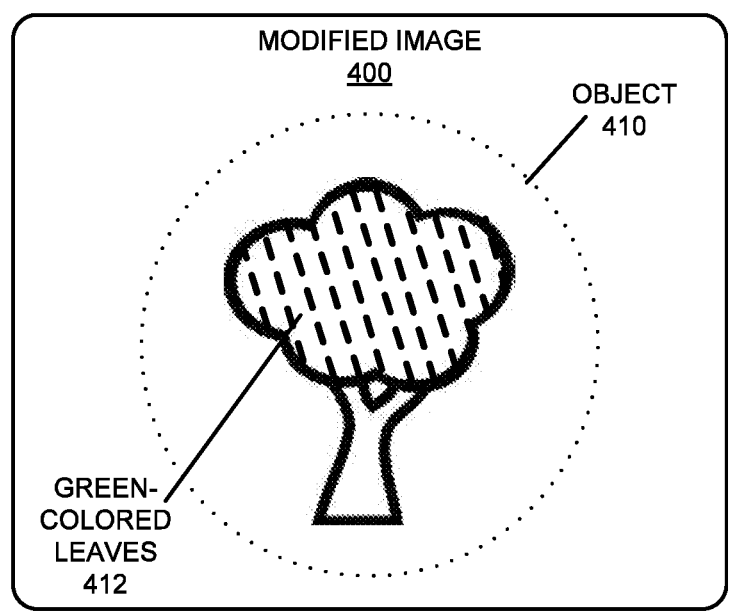
FIG. 4 is a drawing illustrating a modified image based on one or more visual effects associated with the biological lifeform of FIG. 2 in accordance with an embodiment of the present disclosure.

FIG. 4 presents a drawing illustrating an example of modified image 400 based on one or more visual effects associated with biological lifeform 210 (FIG. 2). In particular, after acquiring image 300 (FIG. 3), the electronic device may generate modified image 400 based on the one or more visual effects associated with biological lifeform 210 (FIG. 2). For example, when biological lifeform 210 (FIG. 2) is a dog, image 300 (FIG. 3) may be corrected for differences between the visual perspective of a dog versus a human. As noted previously, dogs have two types of cones (which are sensitive to blue and yellow light), but not the type of cone that is sensitive to red/green light as in human vision. Consequently, the red-colored leaves in object 310 in image 300 (FIG. 3) may be present in image 400 as object 410 that has green-colored leaves 412, thereby approximating the visual perception of a dog (which is red-green color blind).

In addition, depending on the luminance, the time of day (such as daytime) and/or a distance or range to object 310 (FIG. 3), the dog may have a reduced visual acuity relative to a human. Therefore, object 410 in modified image 400 may be blurry relative to object 310 in image 300 (FIG. 3).

Figure 5:
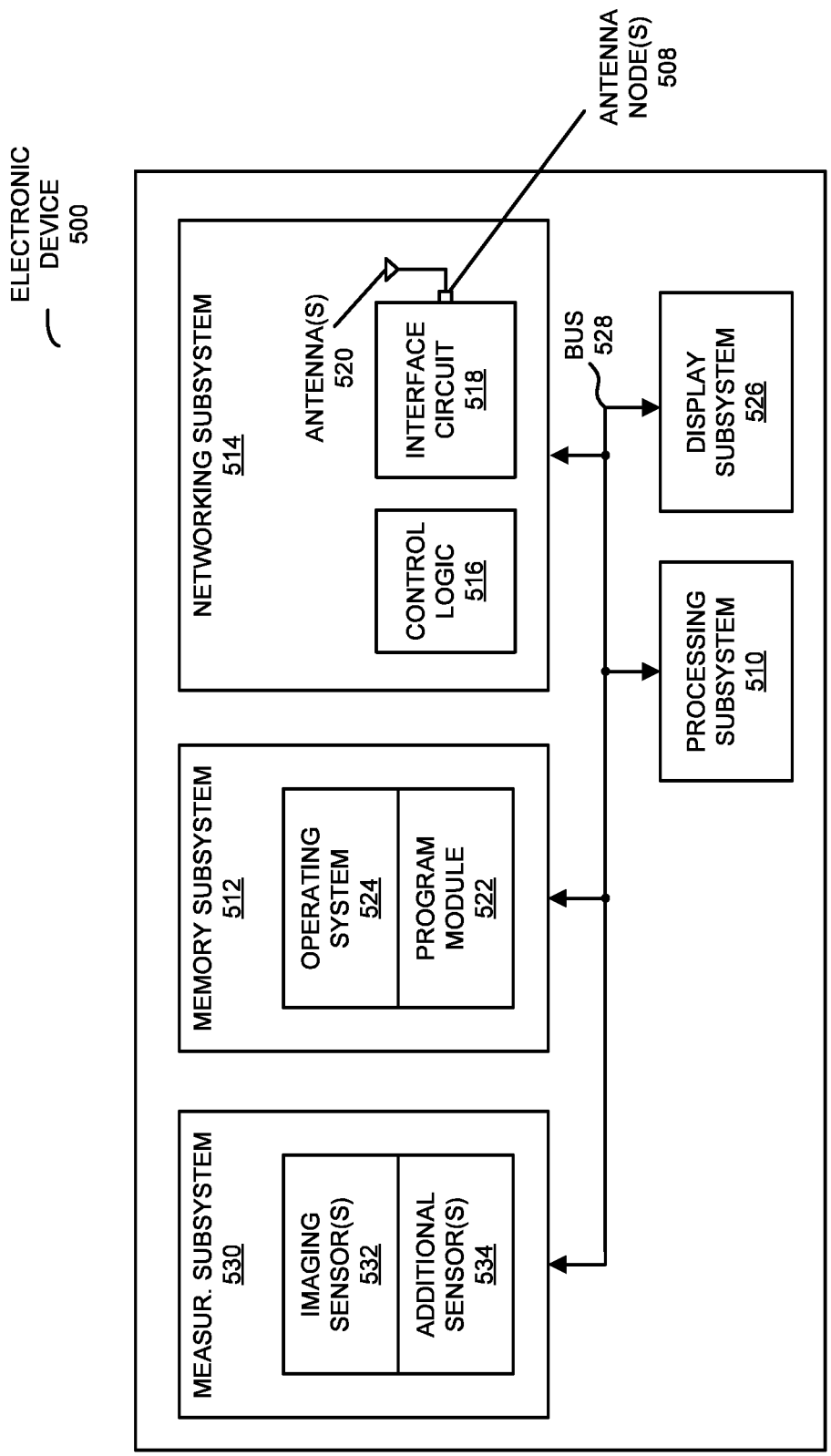
FIG. 5 is a block diagram illustrating an electronic device in accordance with an embodiment of the present disclosure.

We now describe embodiments of an electronic device, which may perform at least some of the operations in the imaging technique. FIG. 5 presents a block diagram illustrating an electronic device 500 in accordance with some embodiments. This electronic device includes processing subsystem 510, memory subsystem 512, and networking subsystem 514. Processing subsystem 510 includes one or more devices configured to perform computational operations. For example, processing subsystem 510 can include one or more microprocessors, ASICs, microcontrollers, programmable-logic devices, graphical processor units (GPUs) and/or one or more digital signal processors (DSPs).

Memory subsystem 512 includes one or more devices for storing data and/or instructions for processing subsystem 510 and networking subsystem 514. For example, memory subsystem 512 can include dynamic random access memory (DRAM), static random access memory (SRAM), and/or other types of memory (which collectively or individually are sometimes referred to as a 'computer-readable storage medium'). In some embodiments, instructions for processing subsystem 510 in memory subsystem 512 include: one or more program modules or sets of instructions (such as program module 522 or operating system 524), which may be executed by processing subsystem 510. Note that the one or more computer programs may constitute a computer-program mechanism. Moreover, instructions in the various modules in memory subsystem 512 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 510.

In addition, memory subsystem 512 can include mechanisms for controlling access to the memory. In some embodiments, memory subsystem 512 includes a memory hierarchy that comprises one or more caches coupled to a memory in electronic device 500. In some of these embodiments, one or more of the caches is located in processing subsystem 510.

In some embodiments, memory subsystem 512 is coupled to one or more high-capacity mass-storage devices (not shown). For example, memory subsystem 512 can be coupled to a magnetic or optical drive, a solid-state drive, or another type of mass-storage device. In these embodiments, memory subsystem 512 can be used by electronic device 500 as fast-access storage for often-used data, while the mass-storage device is used to store less frequently used data.

Networking subsystem 514 includes one or more devices configured to couple to and communicate on a wired and/or wireless network (i.e., to perform network operations), including: control logic 516, an interface circuit 518 and one or more antennas 520 (or antenna elements). (While FIG. 5 includes one or more antennas 520, in some embodiments electronic device 500 includes one or more nodes, such as nodes 508, e.g., a pad, which can be coupled to the one or more antennas 520. Thus, electronic device 500 may or may not include the one or more antennas 520.) For example, networking subsystem 514 can include a Bluetooth networking system, a cellular networking system (e.g., a 3G/4G network such as UMTS, LTE, etc.), a universal serial bus (USB) networking system, a networking system based on the standards described in IEEE 802.11 (e.g., a Wi-Fi networking system), an Ethernet networking system, and/or another networking system.

Networking subsystem 514 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 500 may use the mechanisms in networking subsystem 514 for performing simple wireless communication between the electronic devices, e.g., transmitting frames and/or scanning for frames transmitted by other electronic devices.

Within electronic device 500, processing subsystem 510, memory subsystem 512, and networking subsystem 514 are coupled together using bus 528. Bus 528 may include an electrical, optical, and/or electro-optical connection that the subsystems can use to communicate commands and data among one another. Although only one bus 528 is shown for clarity, different embodiments can include a different number or configuration of electrical, optical, and/or electro-optical connections among the subsystems.

In some embodiments, electronic device 500 includes a display subsystem 526 for displaying information on a display, which may include a display driver and the display, such as a liquid-crystal display, a multi-touch touchscreen, etc.

Furthermore, electronic device 500 may include a measurement subsystem 530, which may include one or more imaging sensors 532 for acquiring images and/or one or more optional additional sensors 534 (such as a light-intensity sensor, or a distance or ranging sensor).

Electronic device 500 can be (or can be included in) any electronic device with at least one network interface. For example, electronic device 500 can be (or can be included in): a desktop computer, a laptop computer, a subnotebook/netbook, a server, a computer, a mainframe computer, a cloud-based computer, a tablet computer, a smartphone, a cellular telephone, a smartwatch, a consumer-electronic device, a portable computing device, a digital camera, a video recorder, a transceiver, and/or another electronic device.

Although specific components are used to describe electronic device 500, in alternative embodiments, different components and/or subsystems may be present in electronic device 500. For example, electronic device 500 may include one or more additional processing subsystems, memory subsystems, networking subsystems, display subsystems and/or measurement subsystems. Additionally, one or more of the subsystems may not be present in electronic device 500. Moreover, in some embodiments, electronic device 500 may include one or more additional subsystems that are not shown in FIG. 5. Also, although separate subsystems are shown in FIG. 5, in some embodiments some or all of a given subsystem or component can be integrated into one or more of the other subsystems or component(s) in electronic device 500. For example, in some embodiments program module 522 is included in operating system 524 and/or control logic 516 is included in interface circuit 518.

Moreover, the circuits and components in electronic device 500 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit (which is sometimes referred to as a 'communication circuit' or a 'means for communication') may implement some or all of the functionality of networking subsystem 514. The integrated circuit may include hardware and/or software mechanisms that are used for transmitting wireless signals from electronic device 500 and receiving signals at electronic device 500 from other electronic devices. Aside from the mechanisms herein described, radios are generally known in the art and hence are not described in detail. In general, networking subsystem 514 and/or the integrated circuit can include any number of radios. Note that the radios in multiple-radio embodiments function in a similar way to the described single-radio embodiments.

In some embodiments, networking subsystem 514 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals)

Moreover, another integrated circuit may implement some or all of the functionality related to the imaging technique.

In some embodiments, an output of a process for designing a given integrated circuit, or a portion of the given integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the given integrated circuit or the portion of the given integrated circuit. Although various formats may be used for such encoding, these data structures are commonly written in: Caltech Intermediate Format (CIF), Calma GDS II Stream Format (GDSII) or Electronic Design Interchange Format (EDIF). Those of skill in the art of integrated circuit design can develop such data structures from schematics of the type detailed above and the corresponding descriptions and encode the data structures on the computer-readable medium. Those of skill in the art of integrated circuit fabrication can use such encoded data to fabricate integrated circuits that include one or more of the circuits described herein.

While some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the imaging technique may be implemented using program module 522, operating system 524 (such as a driver for interface circuit 518) or in firmware in interface circuit 518. Alternatively or additionally, at least some of the operations in the imaging technique may be implemented in a physical layer, such as hardware in interface circuit 518.

Figure 6:
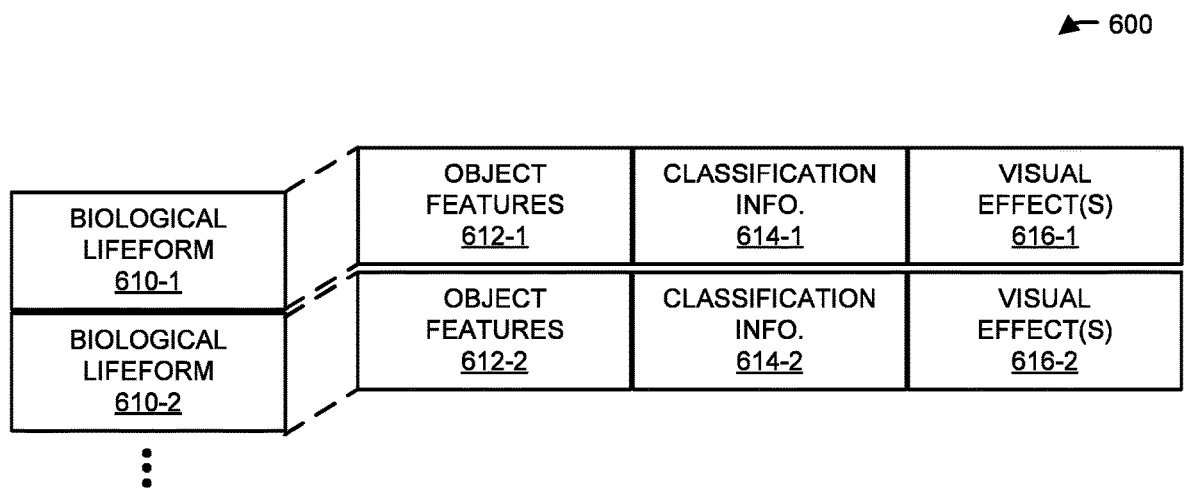
FIG. 6 is a block diagram illustrating a data structure for use with the electronic device of FIG. 5 in accordance with an embodiment of the present disclosure.

FIG. 6 presents a block diagram illustrating an example of a data structure 600 for use with electronic device 500 (FIG. 5). In particular, data structure 600 may include information associated with biological lifeforms 610, such as: object features 612, classification information 614 (e.g., a species, a genus, a breed, a pet's name, etc.), and/or visual-effect information 616 (e.g., information that specifies a visual perspective of a biological lifeform). Note that data structure 600 may include fewer or additional fields, two or more fields may be combined, and/or a position of a given field may be changed.

In the preceding description, we refer to 'some embodiments.' Note that 'some embodiments' describes a subset of all of the possible embodiments, but does not always specify the same subset of embodiments. Note that numerical values in the preceding embodiments are illustrative examples of some embodiments. In other embodiments of the imaging technique, different numerical values may be used.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A non-transitory computer-readable storage medium for use in conjunction with an electronic device, the computer-readable storage medium storing program instructions, wherein, when executed by the electronic device, the program instructions cause the computer system to perform one or more operations comprising:
acquiring a first image that includes a biological lifeform using a first imaging sensor in the electronic device;
identifying the biological lifeform in the first image;
acquiring a second image that includes an object using a second imaging sensor in the electronic device, wherein the second imaging sensor faces in an opposite direction on the electronic device from the first imaging sensor; and
generating a modified second image that includes the object based on a visual effect associated with the identified biological lifeform, wherein the visual effect simulates visual perception during sensory processing in a visual system of the biological lifeform, so that the modified second image approximates a visual perspective of the biological lifeform.

2. The computer-readable storage medium of claim 1, wherein the biological lifeform comprises one of: an animal that is different from a human, or an insect.

3. The computer-readable storage medium of claim 1, wherein the visual effect comprises at least one of: color filtering corresponding to a chromate type of the biological lifeform that corresponds to a number of photoreceptor types of the biological lifeform, a field of view of the biological lifeform, or a resolution of the biological lifeform.

4. The computer-readable storage medium of claim 1, wherein the one or more operations comprise determining a distance from the electronic device to the object or from the biological lifeform to the object, and the visual effect corresponds to a visual acuity of the biological lifeform.

5. The computer-readable storage medium of claim 1, wherein the visual effect corresponds to a number of eyes of the biological lifeform.

6. The computer-readable storage medium of claim 1, wherein the second image comprises a video and the visual effect of the modified second image corresponds to a refresh rate of vision associated with the biological lifeform.

7. The computer-readable storage medium of claim 1, wherein the second image is acquired using an imaging configuration corresponding to vision associated with the biological lifeform.

8. An electronic device, comprising:
one or more imaging sensors configured to acquire images; and
an integrated circuit, coupled to the one or more imaging sensors, configured to:
acquire a first image that includes a biological lifeform using a first imaging sensor in the one or more imaging sensors;
identify the biological lifeform in the first image;
acquire a second image that includes an object using a second imaging sensor in the one or more imaging sensors, wherein the second imaging sensor faces in an opposite direction on the electronic device from the first imaging sensor; and
generate a modified second image of that includes the object based on a visual effect associated with the identified biological lifeform, wherein the visual effect simulates visual perception during sensory processing in a visual system of the biological lifeform, so that the modified second image approximates a visual perspective of the biological lifeform.

9. The electronic device of claim 8, wherein the visual effect comprises at least one of: color filtering corresponding to a chromate type of the biological lifeform that corresponds to a number of photoreceptor types of the biological lifeform, a field of view of the biological lifeform, or a resolution of the biological lifeform.

10. The electronic device of claim 8, wherein the integrated circuit is configured to determine a distance from the electronic device to the object or from the biological lifeform to the object, and the visual effect corresponds to a visual acuity of the biological lifeform.

11. The electronic device of claim 8, wherein the integrated circuit is included in the one or more imaging sensors.

12. The electronic device of claim 8, wherein the integrated circuit comprises:
a processor; and
memory, coupled to the processor, configured to store program instructions, wherein, when executed by the processor, the program instructions cause the electronic device to perform one or more operations, comprising one or more of: the acquiring the first image, the identifying the object, the acquiring the second image, or the generating of the modified second image.

13. An integrated circuit, comprising:
an interface configured to couple to one or more imaging sensors, wherein the integrated circuit is configured to:
acquire a first image that includes a biological lifeform using a first imaging sensor in the electronic device;
identify the biological lifeform in the first image;
acquire a second image that includes an object using a second imaging sensor in the electronic device, wherein the second imaging sensor faces in an opposite direction on the electronic device from the first imaging sensor; and
generate a modified second image that includes the object based on a visual effect associated with the identified biological lifeform, wherein the visual effect simulates visual perception during sensory processing in a visual system of the biological lifeform, so that the modified second image approximates a visual perspective of the biological lifeform.

14. The integrated circuit of claim 13, wherein the biological lifeform comprises one of: an animal that is different from a human, or an insect.

15. The integrated circuit of claim 13, wherein the visual effect comprises at least one of: color filtering corresponding to a chromate type of the biological lifeform that corresponds to a number of photoreceptor types of the biological lifeform, a field of view of the biological lifeform, or a resolution of the biological lifeform.

16. The integrated circuit of claim 13, wherein the integrated circuit is configured to determine a distance from the electronic device to the object or from the biological lifeform to the object, and the visual effect corresponds to a visual acuity of the biological lifeform.

17. The integrated circuit of claim 13, wherein the visual effect of the modified second image corresponds to a number of eyes of the biological lifeform.

18. The integrated circuit of claim 13, wherein the second image comprises a video and the visual effect corresponds to a refresh rate of vision associated with the biological lifeform.

19. The electronic device of claim 8, wherein the biological lifeform comprises one of: an animal that is different from a human, or an insect.

20. The electronic device of claim 8, the second image comprises a video and the visual effect of the modified second image corresponds to a refresh rate of vision associated with the biological lifeform.

\* \* \* \* \*